United States Patent [19]

Mills et al.

[11] Patent Number: 4,726,898

[45] Date of Patent: Feb. 23, 1988

[54] APPARATUS FOR SPINNING FRUIT FOR SORTING THEREOF

[75] Inventors: George A. Mills; Ian A. Brown, both of Tulare County, Calif.

[73] Assignee: Pennwalt Corporation, Philadelphia, Pa.

[21] Appl. No.: 823,874

[22] Filed: Jan. 29, 1986

Related U.S. Application Data

[63] Continuation-in-part of Ser. No. 430,083, Sep. 30, 1982.

[51] Int. Cl.⁴ .................... B07C 5/02; B07C 5/342
[52] U.S. Cl. .................................. 209/545; 209/581;
209/587; 209/701; 209/939
[58] Field of Search ........ 209/555, 556, 558, 563–566,
209/576, 577, 580, 581, 587, 701, 540, 541, 545, 939

[56] References Cited

U.S. PATENT DOCUMENTS

| | | | |
|---|---|---|---|
| 1,677,656 | 7/1928 | Roberts et al. | 209/701 |
| 2,057,849 | 10/1936 | Sharp | 209/701 |
| 3,013,661 | 12/1961 | Strubhar | 209/581 |
| 3,575,292 | 4/1971 | Roda | 209/701 X |
| 4,106,628 | 8/1978 | Warkentin et al. | 209/580 X |
| 4,122,951 | 10/1978 | Alaminos | 209/545 |
| 4,184,598 | 1/1980 | Cowlin et al. | 209/705 |
| 4,213,533 | 7/1980 | Sardo | 209/701 X |
| 4,221,297 | 9/1980 | Lopez et al. | 209/939 X |

FOREIGN PATENT DOCUMENTS

| | | | |
|---|---|---|---|
| 0155487 | 6/1982 | Fed. Rep. of Germany | 209/577 |
| 0987518 | 1/1983 | U.S.S.R. | 209/580 |

Primary Examiner—Robert B. Reeves
Assistant Examiner—Edward M. Wacyra
Attorney, Agent, or Firm—Seidel, Gonda, Goldhammer & Abbott

[57] ABSTRACT

Several conveyor rollers of singulators are made to rotate by a fruit orientation belt causing fruit carried thereon to rotate in accordance with movement of the belt such that the rotational axes of the fruit, typically lemons, orient themselves along their stem axes, or substantially perpendicularly to the direction of travel of the singulators. Downstream, the rollers contact a rotating spin-accelerating belt to substantially increase speed of rotation of the rollers and oriented fruit thereon in order to permit optical scanning devices to scan a much larger percentage of the fruit surface areas. Fruit rotate in the same direction of rotation during orientation and spin-acceleration, the latter occurring for only a very short duration.

12 Claims, 4 Drawing Figures

APPARATUS FOR SPINNING FRUIT FOR SORTING THEREOF

This application is a continuation-in-part of copending application of the same title, Ser. No. 430,083, filed Sept. 30, 1982, of George A. Mills, assigned to the assignee hereof.

STATEMENT OF THE INVENTION

The present invention relates to fruit sorting apparatus for eliminating culls and unpackable fruit early in the pack line to thereby permit the package fruit, if desired, to be further sorted in accordance with the teachings disclosed in U.S. Pat. No. 4,106,628, or separated into several packable grades in accordance with other known sorting/grading procedures.

BACKGROUND AND SUMMARY OF THE INVENTION

In typical prior art automatic sorting apparatus by means of color, optical sensors inspect each fruit and generate a reject signal in response to the presence of a cull. The reject signal actuates or triggers removal mechanism which deflects or diverts the offending fruit from the pack line. Such optical sensing means however have generally been incapable of detecting a sufficiently large surface area of the fruit being tested or evaluated resulting in the passage of culls into the pack line. Or, if a sufficiently large surface area of the fruit is illuminated and detected, the rate of progress of the fruit through the pack line is undesirably slow. Of course, additional optical sensors and detectors could be added with a concomitant increase in cost, number of components and floor space being required.

The present invention employs a singulator conveyor or a plurality thereof, typically 3 or more, parallel disposed, each of which carry the fruit in single file from the loading chutes. Each singulator conveyor comprises roller conveyors rotatably mounted to chain drive means. The roller conveyors may be adjustably spaced along the chains in accordance with the size of fruit to cause each item of fruit to be carried by adjacent roller conveyors. The roller conveyors contact a moving fruit orientation belt which causes the roller conveyors to rotate accordingly. Rotating the rollers causes the fruit carried thereon to rotate in an opposite direction on stem axes, the axes of rotation and stem axes being substantially perpendicularly disposed to the direction of travel of the singulators.

Absent the fruit orientation belt, the roller conveyors would tend to transport the fruit therealong without the necessary rotation thereof, thus failing to orient the fruit in accordance with their stem axes, resulting in many fruit flipping off the conveyors when subjected to the momentary high spin section of the apparatus.

Thus, after the fruit are oriented, they encounter additional roller conveyors rotating at a substantially increased speed in a direction of rotation which continues the direction of rotation of the fruit as they leave the portion of the apparatus which has just oriented them. That is, the upper surfaces of the fruit during orientation and spin-acceleration, are moving in the same direction as the singulators are moving. Fruit thus rotating allow overhead cameras to "see" slightly more of the surface area of the fruit during passage therebelow for purposes of scanning.

More specifically, in parent application Ser. No. 430,083, the spin-acceleration section reversed the direction of rotation of the oriented fruit causing the fruit to occasionally bounce, upon entering or during spin-acceleration, and frequently causing succeeding fruit to similarly bounce. Bouncing fruit cannot readily be optically scanned by the apparatus shown and described in the present invention.

Citrus fruit such as lemons may be spun up to 6 or more revolutions per second for brief periods without damaging the fruit and yet allowing the fruit to turn about one complete revolution while being illuminated and scanned. Absent the orientation section, a lemon, for example, spin-accelerated at approximately 6 revolutions per second, would, in all probability, flip off the conveyor rollers or bounce thereon, if the fruit's direction of rotation were reversed by the spin-acceleration section. As mentioned above, by permitting the fruit to continue rotating in the same direction in the spin-acceleration section, flipping and bouncing of fruit have been eliminated.

After the surfaces of the fruit are scanned, and responsive signals generated in accordance with the scan, typically by means of a line scanning camera, ejection mechanism, for example, may be actuated in response to those signals to control deflection of the culls. The remaining packable fruit may optionally be separated into several packable grades or sorted in accordance with the teachings of the referenced Patent.

It is appreciated that the packable fruit of the present invention after cull deflection or diversion, may be sorted and/or graded in accordance with the teachings of the referenced patent or other known fruit packing principles or procedures.

DETAILED DESCRIPTION OF THE INVENTION

A. Adapted for Use with Invention Disclosed in U.S. Pat. No. 4,106,628

The present invention may be used with the sorter disclosed in U.S. Pat. No. 4,106,628, incorporated herein by reference, and assigned to the present assignee hereof.

Figure 1:
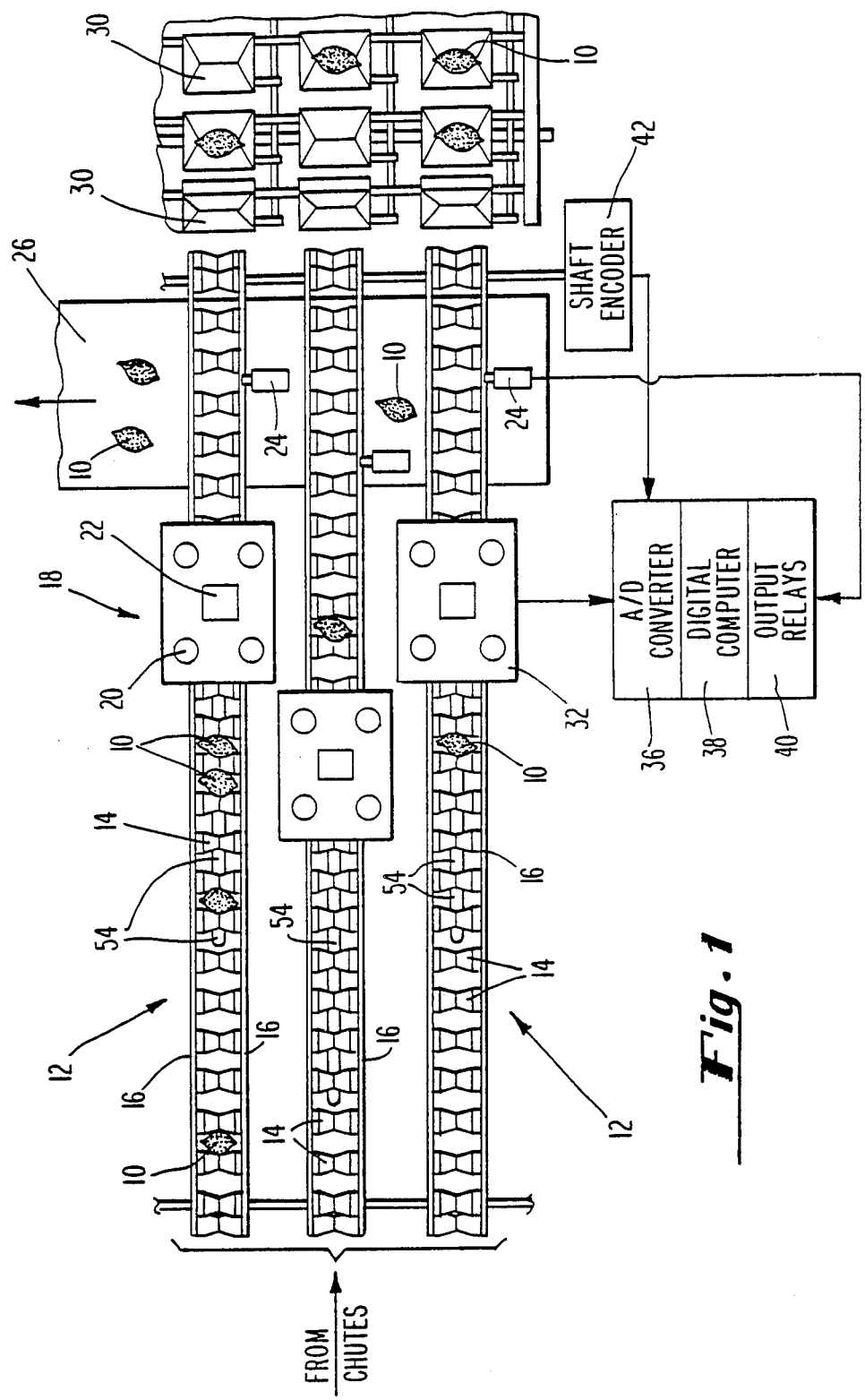
FIG. 1 is a schematic plan view of the apparatus of the present invention including a block diagram of components employed therewith.

Referring to the drawings, articles to be sorted, or sorted and graded, typically fruit such as lemons 10, but not limited thereto, are received from chutes (not shown) and arranged in single file by an entrance portion of singulator conveyors 12, three such singulators being illustrated in FIG. 1. Instead of chutes, belt conveyors may be used to deposit the fruit on the singulators as shown and described in the referenced Patent.

Figure 4:
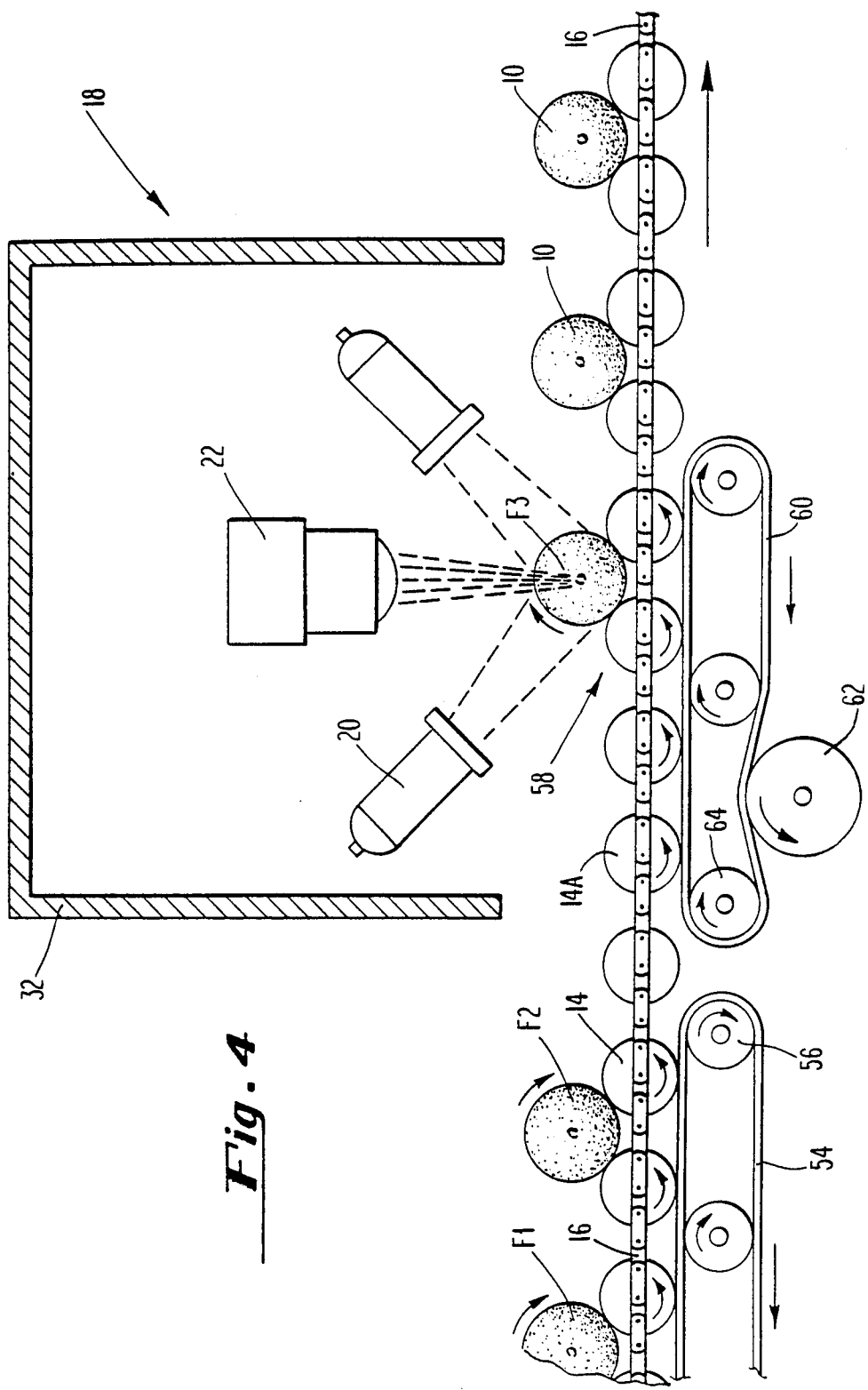
FIG. 4 is a diagrammatic representation, in elevation, illustrating a fragment of the apparatus of FIG. 1.

Singulator 12 comprises a plurality of spaced apart conveyor rollers 14 rotatably mounted on each side thereof to chains 16 which advance the fruit from left to right (FIGS. 1 and 4).

Other components of the apparatus of the present invention include optical scanning units 18, each comprising a plurality of illuminators 20 for uniformly illuminating the surface areas of the fruit being tested or evaluated with visible, ultra-violet or infra-red radiation, depending upon the specific application. Four illuminators are employed in the illustration of FIG. 1. Illuminators 20 direct their radiation to the surfaces of the fruit at an angle of approximately 25° to thereby illuminate edges of the fruit substantially evenly. The illuminated fruit surfaces are detected by a line scanning camera 22 which generates video signals in response thereto for controlling ejector mechanism 24, later described, which ejects the culls or unpackable fruit onto an endless conveyor belt 26 for discharge into cull bins and the like. The remaining fruit may continue along the pack line, to be color categorized, for example, by additional optical detection devices and then electronically weighed after fruit 10 has fallen into cups 30, and further processed, all as shown and described in the referenced Patent; or the remaining fruit may be separated into several package grades.

Each optical scanning unit 18 is enclosed in a suitable housing 32 (FIG. 4) which housing are preferably staggered (FIG. 1) to permit closer spacing of the singulators.

Line scanning camera 22 typically may comprise any suitable line scanning device such as a television camera or discrete detector array, for example, or the line scanning may be mechanically generated to provide signals proportional to the reflected light intensity.

The video signal generated by line scanning camera 22 are digitalized by an A/D converter 36. The digitalized signals are fed into a commercially available digital computer 38 capable of performing evaluations of the fruit in accordance with its general appearance or color, its maturity, or blemishes and discolorations thereon. Digital computer 38 is programmed to analyze reflectance obtained on each item of fruit and to generate responsive signals which are fed into output relays 40 for control of ejector mechanism 24, or alternatively, the output relay signals may be fed into another computer for additional fruit control or processing. Ejector mechanism 24 may comprise solenoid-controlled pistons, for example, the solenoids actuated by signals from output relays 40.

A shaft encoder 42 may be employed for generating clocking signals to synchronize the mechanical movement of the fruit with their electronic positioning. The encoder signals will be fed into A/D converter 36, digitalized by digital computer 38 for generation of signals by output relays 40 for fruit synchronization and positioning.

B. The Fruit Orientation Section

Figure 2:
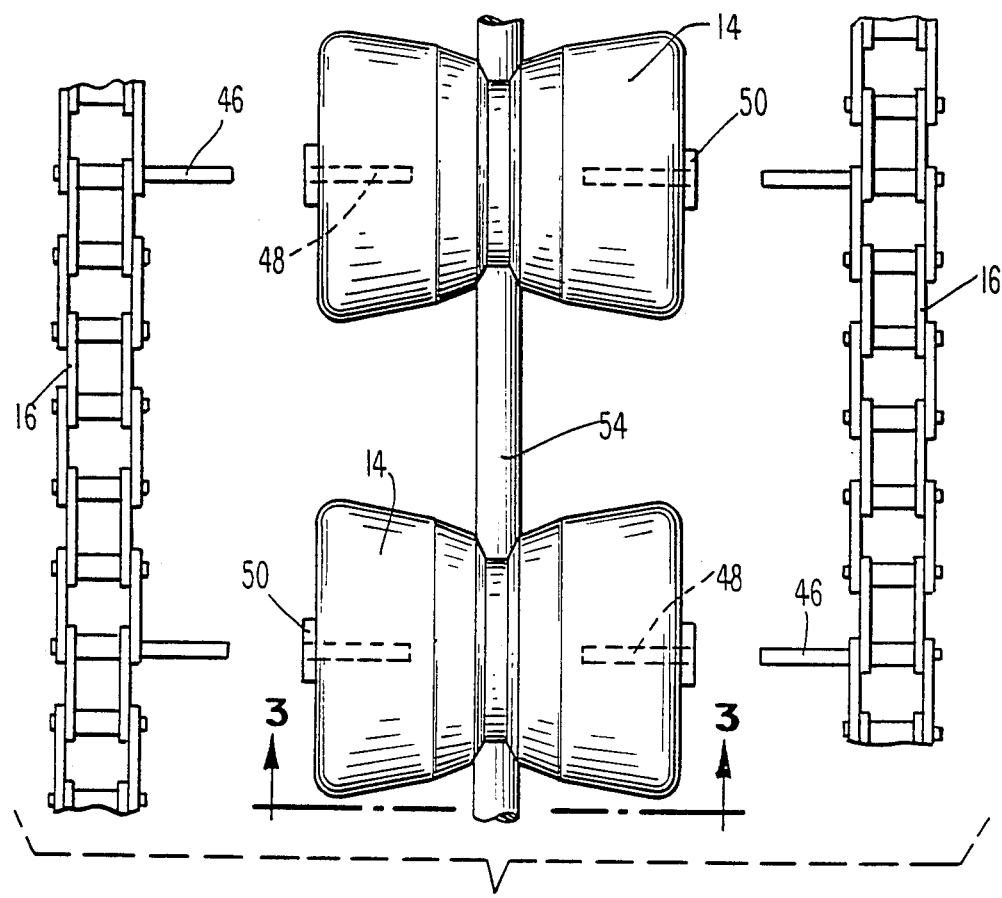
FIG. 2 is an exploded plan view of a portion of the apparatus of FIG. 1 including roller conveyors and chain drive means.
Figure 3:
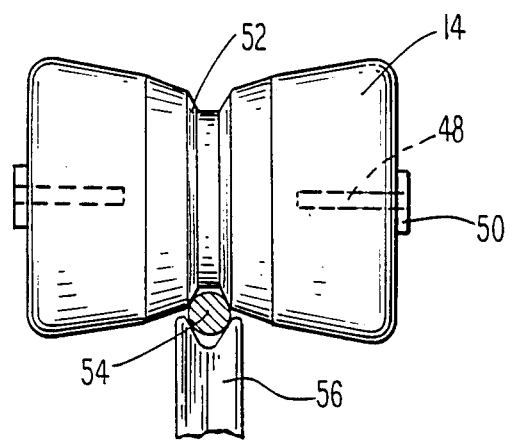
FIG. 3 is a sectional view, partly in phantom, taken along line 3—3 of FIG. 2.

Referring to FIGS. 2, 3, and 4, chains 16 are provided with lugs 46 which engage axial bores 48 provides in conveyor rollers 14. Suitable washer, separation or spacer means 50 may be affixed to rollers 14 to prevent direct contact between the chains and the conveyor rollers. Alternatively, an axial bushing (not shown) through the rollers may receive the lugs 46. Lugs 46 may be adjustably spaced along chains 16 as desired in accordance with the average size fruit being conveyed. Preferably however, conveyor rollers will be made of plastic, in which case the spacer means 50 may be eliminated.

Conveyor rollers 14 are configured as illustrated and include a necked-down portion 52 which contacts and rides upon a fruit orientation belt 54 (see also FIG. 1) disposed below the singulators 12. Belts 54 are driven by motor driven driver pulley (not shown) cooperating with several idler pulleys 56 (FIG. 3). The orientation belts 54 should be at least several feet in length in order to contact a sufficient number of conveyor rollers 14 to cause rotation thereof for proper orientation of the fruit. Rotation of conveyor rollers 14 by the orientation belt 54 of FIG. 4 rotates lemons 10 at approximately 1 rps to less than 4 rps.

C. The Fruit Spin-Acceleration Section

In FIG. 4, fruit are moving from left to right. In the fruit orientation section, fruit F1 and F2, for example, are rotating from approximately 1 rps to less than 4 rps and the upper surfaces thereof are moving in the same direction as the direction of movement of the singulators. As the fruit F2 advances toward the spin-acceleration section 58 and contacts the first conveyor roller thereof, i.e., roller 14A, the direction of rotation of fruit 14A is continued and its speed of rotation substantially increased to about 6 rps by means of rotating spin-up belt 60 engaging the necked-down portion 52 of rollers 14. Belt 60 is driven by a driver pulley 62 connected to a suitable motor (not shown). A plurality of idler pulleys 64 insure a sufficient number of rollers 14, typically 4 for lemons, are spinning at the accelerated spin rate. Decelerating roller speed by suitable means immediately after spin-accelerating section may optionally be employed to prevent possible fruit flip-off.

If however, roller 14A and the remaining three rollers of spin-acceration section 58 were rotating in a direction other than as shown in FIG. 4, or as shown and described in parent application Ser. No. 430,083, the oriented fruit would be urged to suddenly change their direction of rotation when entering the spin-acceleration section, resulting in a bouncing of the fruit, frequently or occasionally, depending upon the type and size of fruit being spin-accelerated. Since the conveyor rollers continue to advance whether fruit thereon are bouncing or not, an oncoming roller impacting a bouncing piece of fruit often causes the fruit to continue bouncing or to flip off the conveyor.

Meanwhile, succeeding fruit can start bouncing, upon entering the spin-acceleration section or by coming into contact with an already bouncing piece of fruit. When viewed from above, the bouncing pieces of fruit resemble a crawling centipede, hence the term "centipede effect".

By causing the spin-accelerated fruit to rotate in the same direction as the oriented fruit, the centipede effect is eliminated.

After optical evaluation of the fruit, and the culls and unpackable fruit deflected from the pack line by ejector mechanism 24, the remaining fruit may proceed down the pack line as aforediscussed.

In FIG. 4, fruit F3 completes about 1 or more revolutions depending upon the diameter of the fruit, while advancing about 3 inches, thereby exposing most of its surface area, excepting the ends thereof, to optical scanning unit 18. Fruits having a larger or smaller diameter than lemons are capable of being sorted/graded in accordance with the present invention. Thus, fruit of smaller diameter will spin at a higher rpm than larger diameter fruit. The smaller diameter fruit however are illuminated and scanned in a lesser amount of time, permitting them to be "seen" substantially completely in less than 3" of travel.

The present apparatus may be used advantageously with more spherically-shaped fruit, such as oranges, for example, which have less defined axes of symmetry.

As previously mentioned, sufficiently large surface areas of the fruit are permitted to be scanned by the present apparatus which results in early deflection of substantially all culls and unpackable fruit from the pack line.

The singulator conveyors may be run at a constant speed throughout completely unaffected by the operation of the spin-accelerating apparatus.

The apparatus is versatile and may be employed at the beginning of currently operated fruit sorter/grader pack lines for early elimination of culls while the remaining packable fruit may be processed accordingly.

We claim:

1. Sorting apparatus for articles comprising:
   (a) a continuous conveyor including a plurality of spaced roller means for transporting said articles,
   (b) orientation means for orienting said articles on said roller means to provide lowest moments of inertia to said articles while rotating the articles on axes of rotation thereof, said axes of rotation being substantially parallel to the plane of said conveyor and perpendicular to the direction of travel of said conveyor, said orientation means rotating said articles such that upper surfaces thereof move in the same direction as said conveyor,
   (c) spin-accelerator means substantially immediately downstream of said orientation means and operatively associated with said roller means for increasing rotational speed of said articles substantially above the speed of rotation provided by said orientation means and for causing the upper surfaces of said spin-accelerated articles to move in the same direction as said conveyor and with the direction of movement of said upper surfaces of said articles the same as imparted by said orientation means,
   (d) means for illuminating said articles while spin-accelerated and moving on said conveyor,
   (e) means for scanning said illuminated articles while spin-accelerated and for generating signals responsive to the scan, and
   (f) means responsive to said signals for sorting said scanned articles based on characteristics of said signals.

2. Apparatus of claim 1 wherein said articles have a length to diameter ratio greater than 1 and said rotation axes coincide with axes of symmetry of said articles.

3. Apparatus of claim 1 wherein said sorting of said scanned articles includes ejection of a portion thereof and wherein articles not so ejected are further sorted and graded.

4. Apparatus of claim 1 wherein said conveyor is driven by chains and said rollers means are conveyor rollers rotatably mounted to said chains.

5. Apparatus of claim 1 wherein said articles are fruit.

6. Apparatus of claim 5 wherein said fruit are citrus fruit.

7. Apparatus of claim 6 wherein said citrus fruit are lemons and said axes of rotation of said lemons after orientation thereof by said orientation means are stem axes.

8. Apparatus of claim 7 wherein axes of rotation of said conveyor rollers are transverse to direction of travel of said conveyor.

9. Apparatus of claim 8 wherein each of said conveyor rollers is provided with a central necked-down portion.

10. Apparatus of claim 9 wherein said orientation means comprises a moving orientation belt supported below said conveyor rollers, said orientation belt engaging said conveyor rollers at said central necked-down portions.

11. Apparatus of claim 10 wherein said orientation belt engages a sufficient number of said rollers to cause fruit thereon to orient themselves in accordance with their lowest moments of inertia while rotating on said axes of rotation.

12. Apparatus of claim 1 wherein said sorting apparatus includes a plurality of parallel disposed continuous conveyors, said illuminating and scanning means for each conveyor protected by a housing, each of said housings being staggered along said plurality of conveyors.

* * * * *